US008483663B1

(12) United States Patent
Jones

(10) Patent No.: US 8,483,663 B1
(45) Date of Patent: *Jul. 9, 2013

(54) REDUCING MOBILE-PHONE FRAUD

(75) Inventor: Bryce A. Jones, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/604,185

(22) Filed: Sep. 5, 2012

Related U.S. Application Data

(63) Continuation of application No. 12/905,205, filed on Oct. 15, 2010, now Pat. No. 8,295,812.

(51) Int. Cl.
*H04M 1/66* (2006.01)

(52) U.S. Cl.
USPC ........... 455/411; 455/410; 455/418; 455/419; 455/420

(58) Field of Classification Search
USPC ................... 455/410–411, 418–420; 726/26, 726/34, 36; 709/225
See application file for complete search history.

(56) References Cited

U.S. PATENT DOCUMENTS

| | | | | |
|---|---|---|---|---|
| 6,501,380 B1* | 12/2002 | Jakobsson | | 340/571 |
| 6,662,023 B1* | 12/2003 | Helle | | 455/558 |
| 7,266,849 B1* | 9/2007 | Gregory et al. | | 726/34 |
| 7,567,795 B1* | 7/2009 | Champion et al. | | 455/410 |
| 7,783,281 B1* | 8/2010 | Cook et al. | | 455/410 |
| 2002/0186845 A1* | 12/2002 | Dutta et al. | | 380/247 |
| 2003/0043034 A1* | 3/2003 | Baker | | 340/539 |
| 2003/0045328 A1* | 3/2003 | Natsuno | | 455/558 |
| 2004/0110488 A1* | 6/2004 | Komsi | | 455/411 |
| 2004/0192303 A1* | 9/2004 | Puthenkulam | | 455/435.1 |
| 2005/0179519 A1* | 8/2005 | Kawamura et al. | | 340/5.23 |
| 2005/0186854 A1* | 8/2005 | Huang | | 439/677 |
| 2005/0280557 A1* | 12/2005 | Jha et al. | | 340/988 |
| 2006/0009214 A1* | 1/2006 | Cardina et al. | | 455/432.3 |
| 2007/0016676 A1* | 1/2007 | Breuer et al. | | 709/225 |
| 2007/0032227 A1* | 2/2007 | Chen | | 455/418 |
| 2007/0035390 A1* | 2/2007 | Thomas et al. | | 340/539.11 |
| 2007/0038680 A1* | 2/2007 | Casey | | 707/201 |
| 2007/0190995 A1* | 8/2007 | Wang et al. | | 455/419 |
| 2008/0127313 A1* | 5/2008 | Payne et al. | | 726/5 |
| 2008/0233919 A1* | 9/2008 | Kenney | | 455/411 |
| 2008/0238614 A1* | 10/2008 | Delia et al. | | 340/5.85 |
| 2008/0276326 A1* | 11/2008 | Bhansali et al. | | 726/36 |
| 2009/0247122 A1* | 10/2009 | Fitzgerald et al. | | 455/410 |
| 2009/0247131 A1* | 10/2009 | Champion et al. | | 455/411 |
| 2009/0249443 A1* | 10/2009 | Fitzgerald et al. | | 726/2 |
| 2009/0251282 A1* | 10/2009 | Fitzgerald et al. | | 340/5.31 |
| 2009/0253410 A1* | 10/2009 | Fitzgerald et al. | | 455/411 |
| 2009/0287498 A2* | 11/2009 | Choi | | 705/1 |
| 2009/0300771 A1* | 12/2009 | Bhansali et al. | | 726/26 |
| 2010/0134275 A1* | 6/2010 | Fitzgerald et al. | | 340/539.13 |

(Continued)

*Primary Examiner* — Jinsong Hu
*Assistant Examiner* — Nathan Taylor

(57) ABSTRACT

Methods and products for facilitating a method of reducing mobile-phone fraud are provided. One method includes receiving a request to activate a mobile device, determining that it is identified as lost or stolen, communicating to the mobile device activation data that enables the mobile device to communicate via a wireless-telecommunications network despite the fact that the mobile device was determined to be identified as lost or stolen, and communicating to the mobile device functionality-impairment instructions that deliberately disable a set of functional aspects of the mobile device, thereby transforming it from a first state to a second state that is functionally impaired compared to the first state.

19 Claims, 9 Drawing Sheets

U.S. PATENT DOCUMENTS

2010/0138298 A1* 6/2010 Fitzgerald et al. ......... 705/14.53
2010/0216429 A1* 8/2010 Mahajan ....................... 455/411
2010/0219979 A1* 9/2010 Ordogh ................... 340/825.49
2011/0076986 A1* 3/2011 Glendinning et al. ........ 455/411
2011/0145927 A1* 6/2011 Hubner et al. .................. 726/26

* cited by examiner

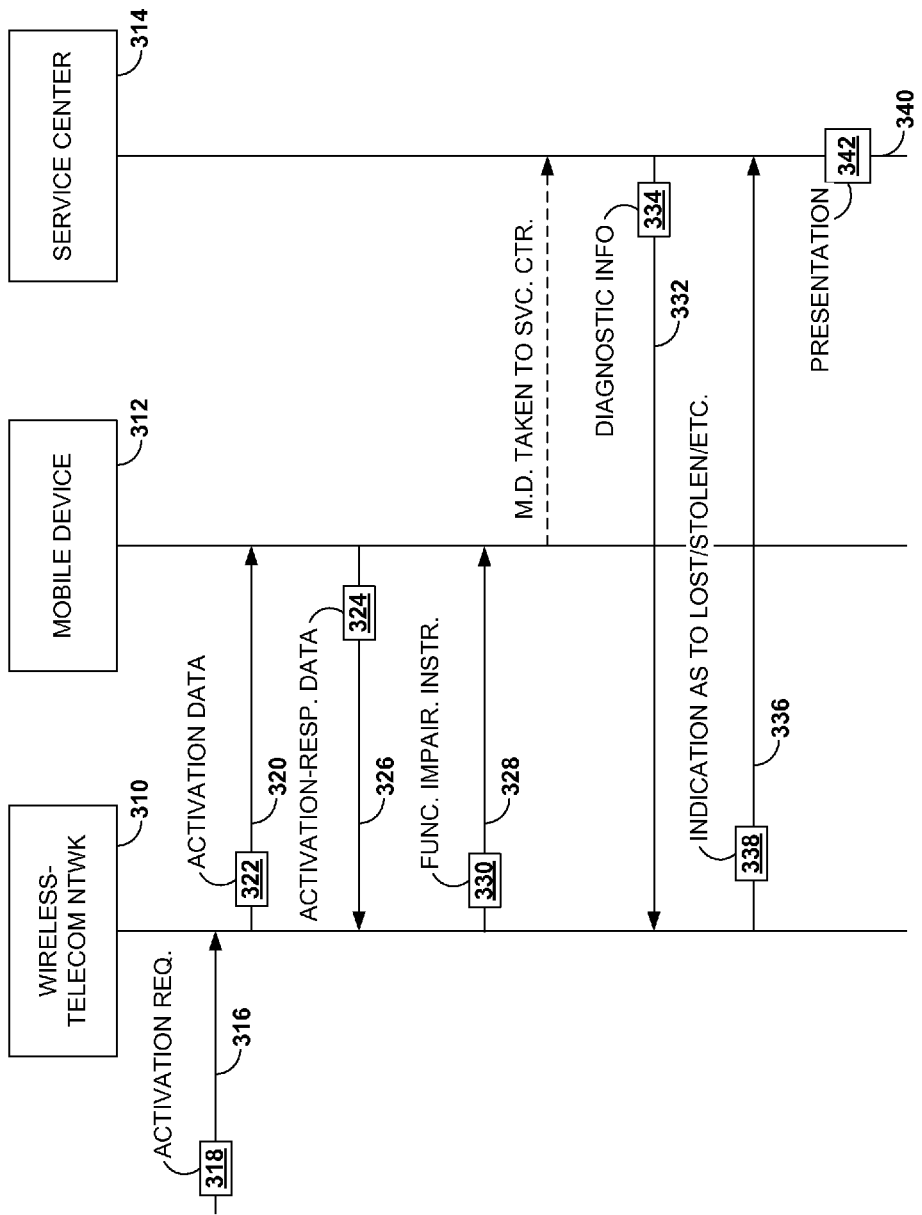

REDUCING MOBILE-PHONE FRAUD

CROSS-REFERENCE TO RELATED APPLICATIONS

This application is a continuation of U.S. patent application Ser. No. 12/905,205, filed Oct. 15, 2010, entitled "Reducing Mobile-Phone Fraud," herein incorporated by reference.

SUMMARY

A high-level overview of various aspects of an embodiment of the invention is provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter. In brief and at a high level, this disclosure describes, among other things, ways of reducing mobile-phone fraud by deliberately inflicting certain functional impairments onto a mobile device that ultimately lead it to be taken into a service center where it can be reclaimed after it is identified as having been reported as lost or stolen.

BRIEF DESCRIPTION OF THE SEVERAL VIEWS OF THE DRAWINGS

Illustrative embodiments of the technology are described in detail below with reference to the attached drawing figures, wherein:

FIGS. 3 and 4 depict illustrative process-flow diagrams that depict methods for reducing mobile-phone fraud according to embodiments of the technology;

DETAILED DESCRIPTION

Figure 1:
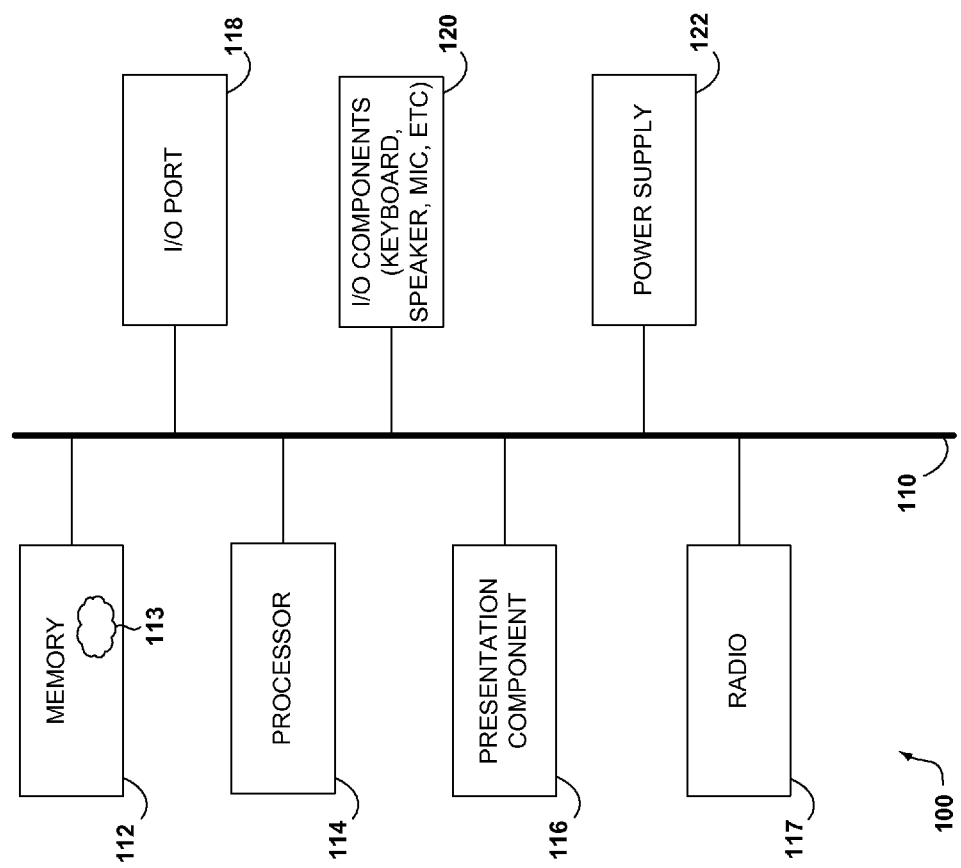
FIG. 1 depicts an exemplary calling device (variously referred to as a "mobile calling device" or sometimes just "phone") according to one embodiment of the technology.

The subject matter of the present technology is described with specificity herein to meet statutory requirements. However, the description itself is not intended to define the technology, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present technology. The following is a list of these acronyms:

| | |
|---|---|
| ASCII | American Standard Code for Information Interchange |
| CDMA | Code Division Multiple Access |
| ESN | Electronic Serial Number |
| GIS | Geographic/Geographical/Geospatial Information System |
| GPRS | General Packet Radio Service |
| GSM | Global System for Mobile communications: originally from Groupe Spécial Mobile |
| MSID | Mobil Subscriber Identifier |
| IP | Internet Protocol |
| LTE | Long Term Evolution |
| PSTN | Public Switched Telephone Network |
| SMS | Short Message Service |
| TDMA | Time Division Multiple Access |
| UMTS | Universal Mobile Telecommunications System |

Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Turning now to FIG. 1, a block diagram of an illustrative communications device according to one embodiment is provided and referenced generally by the numeral 100. Although some components are shown in the singular, they may be plural. For example, communications device 100 might include multiple processors or multiple radios, etc. As illustratively shown, communications device 100 includes a bus 110 that directly or indirectly couples various components together including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions 113 that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio that facilitates communication with a wireless-telecommunications network. Illustrative wireless telecommunications technologies include CDMA, GPRS, TDMA, GSM, and the like (including what is known in the art as WiMax technology and also Long Term Evolution (LTE). In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

As previously mentioned, an embodiment of the technology facilitates a method of reducing mobile-phone fraud. One way of accomplishing this task is to intentionally put a mobile device into an impairment state when it is activated so that when the mobile device is taken in for service, an indication is presented to a technician that the mobile device is reportedly lost, stolen, or should otherwise be physically retained, the mobile device can be physically retained by the technician. Generally, when a mobile device is reported as lost or stolen, rights to that device should go to the owner of the wireless telecommunications network or a representative or designee thereof. In either case, to the extent a party associated with the wireless telecommunications network has the right to apprehend the mobile device, an embodiment of the technology creates a situation whereby such an entity has access to the mobile device.

One way of intentionally disabling certain functional aspects of a mobile device is to communicate functionality-impairment instructions to the mobile device when it is activated. At the time of attempted activation, the mobile device is checked to determine whether it has been reportedly lost or stolen. If so, then at or near the time of activation, functionality-impairment instructions can be communicated to the mobile device in one embodiment. In another embodiment, the functionality-impairment instructions can saliently reside within the mobile device and then be activated by way of a code or other instruction when the mobile device is activated (or at some other time). To activate a mobile device is to enable it to communicate with a given wireless telecommunications network.

Figure 2A:
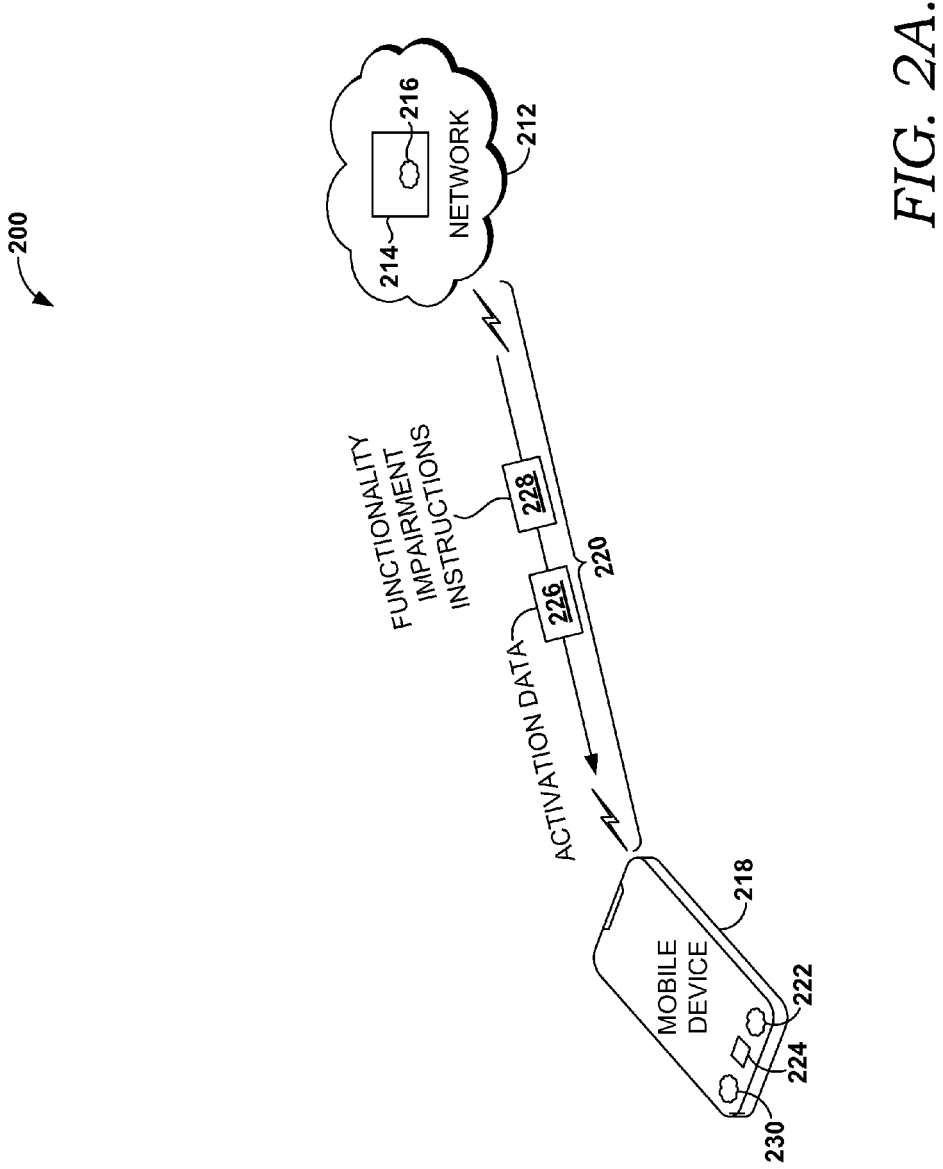
FIGS. 2A and 2B depict illustrative operating environments suitable for practicing an embodiment of the technology.

Turning now to FIG. 2A, an illustrative operating environment according to one embodiment of the technology is provided and referenced generally by the numeral 200. This embodiment includes a wireless telecommunications network 212 that includes a server 214 and a set of embodied computer-executable instructions 216. Wireless telecommunications network 212 can communicate with a mobile device 218 by way of a wireless telecommunications link 220. Mobile device 218 includes a set of embodied computer-executable instructions 222 that carry out various functional aspects of the invention. Mobile device 218 is identifiable by way of a unique identifier 224. The unique identifier 224 can include an electronic serial number, MSID, or other identifier that is usable to uniquely identify mobile device 218. Both mobile device 218 and/or server 214 might take the form of the general computing device represented in FIG. 1. In this embodiment, activation data 226 is ultimately communicated to mobile device 218 as well as functionality-impairment instructions 228 such that they ultimately reside in the mobile device, which is represented by reference numeral 230.

In operation, at some point mobile device 218 is reported as being lost or stolen. In one scenario that lends itself to fraud, a person might report a phone as lost or stolen when in reality it is not. In this situation, a person might maliciously report a phone as lost or stolen while actually retaining control of it. After the phone is reported as lost or stolen, the wireless telecommunications network will deactivate the phone. But the current owner still retains possession of the phone. This leaves the current owner the option of attempting to sell the phone while making an insurance claim against the wireless telecommunications network for a new phone. If, for example, the phone owner had purchased insurance that covered instances of theft and/or loss, then the owner can make a claim that will ultimately result in receiving a new phone. But the owner can sell the reportedly lost phone to another person.

But in some cases, once the reportedly lost phone is reported as lost or stolen, the original owner often has no legal rights to the phone (by way of contract or other). With no legal rights to the phone, the original owner is incapable of legally conveying ownership rights to another party. In fact, in many situations legal title to the phone reverts to the operator of the wireless telecommunications network. Common arrangements are that a wireless telecommunications network operator will subsidize the cost of a phone to encourage customers to subscribe to its wireless-telecommunications services.

The original owner committed fraud when he or she reported a phone as lost or stolen when in reality it wasn't. One way to discourage this sort of fraud is to provide a way for the wireless-telecommunications-network operator to obtain possession of the phone. One way for the operator to regain possession of the phone is to create a scenario in which the phone needs to be serviced and appears serviceable by a technician who is authorized to work on the phone and is associated with the wireless-telecommunications-network operator. Thus, one embodiment of the technology actually allows the phone to be activated by a subsequent user but also causes the phone to be placed into a functionality-impairment state that is characterized by deliberate impairments of various functional aspects of the phone.

This can be accomplished in a variety of ways. One way is to communicate functionality-impairment instructions 228 to mobile device 218 such that they 230 can be executed on a mobile device and thereby place it into a functionality-impairment state. Illustrative functionality impairments include the likes of causing problems with a keyboard of the mobile device, its microphone, its display, other input means, other output means, etc. An illustrative keyboard impairment might include a selection of buttons that no longer input data correctly. In one embodiment, keys such as "9," "1," "0," are left working. This would enable the user to call for emergency help via 911. The full functionality of other keys can also be retained if, for example, they would be used to call customer service, such as "2#." But perhaps the functionality-impairment instructions 230 might cause the "4" key to no longer function. This would be an irritating nuisance that might drive the customer to take the phone into a service center. As will be explained in greater detail below, when the phone is serviced at the service center an embodiment of the technology leads to an indication that is presented that indicates that the phone is reportedly lost or stolen and thus should be confiscated.

An illustrative display impairment would include anything whereby the display does not present data correctly. Perhaps the screen flickers, dims, has certain pixels disabled, will not turn off, anything that is out of the ordinary that would be a nuisance to a subsequent user of the phone could be a display impairment. An illustrative power impairment might include an inability to charge the device, or rapid drain of the battery, or very slow charge of the battery, etc. Again, this would be something noticeable by the user but preferably something that appears to be correctable by a service technician.

The functionality-impairment instructions might also lead to some other form of operational impairment. For example, perhaps a touch-screen device does not respond to touch input as well as it should, does not transition screens as it should, is not calibrated correctly, etc.

The various functionality-impairment examples that we have and will provide herein are illustrative in nature. They are not meant to be exhaustive. Generally, the higher-level point is that a set of functionality-impairment instructions 228 are executed so as to place mobile device 218 in a deliberate functional-impairment state. In one embodiment, the characteristics of the functionality-impairment state are communicated to network 212, such that when a technician either reports what is ostensibly wrong with mobile device 218 (or attempts to diagnose by way of providing unique identifier 224) such information is usable for the wireless telecommunications network 212 to respond that the phone is not actually experiencing problems; but, rather, is lost or stolen. By way of a code or some other means, the phone can be reduced to a normal state of operation after the technician has obtained possession of the phone.

Figure 2B:
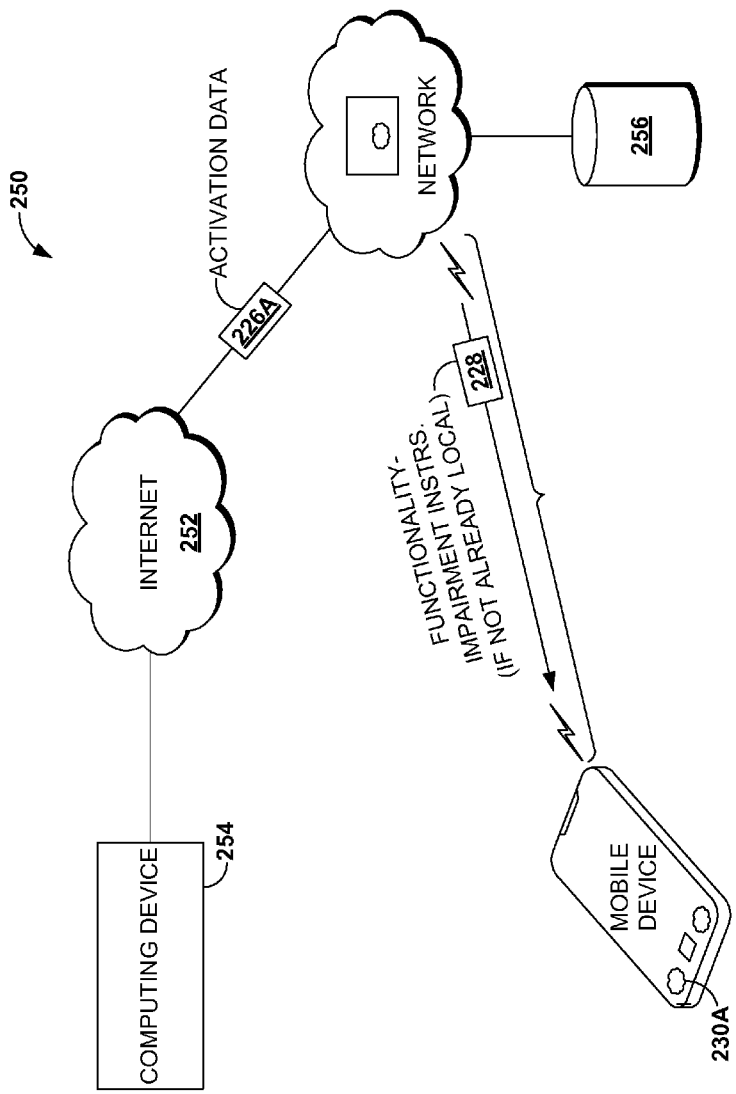

Turning now to FIG. 2B, another illustrative operating environment 250 is provided according to another embodiment of the technology. Those items that are similar to FIG. 2A are not relabeled so as to not obscure various aspects of the technology. In this embodiment, activation data 226A is provided from the wireless telecommunications network via the Internet 252 to a computing device 254, which may be a computer or similar device. In this embodiment, a user leverages the Internet to activate the reportedly lost or stolen phone. For example, a user of computing device 254 might log on to a website that is operated by the wireless-telecommunications-network operator in an attempt to activate the phone.

In one embodiment, after providing identification criteria (such as unique identifier 224, for example), server 214 provides a set of codes to computing device 254 that, when entered into mobile device 218, invokes an activation sequence. A user would input the codes according to the instructions provided, which will lead to the mobile device being activated. In one embodiment, functionality-impairment instructions 228 could then be communicated to mobile device 218 and then executed. In still another embodiment, the functionality-impairment instructions 230A could have always resided on mobile device 218 but be executed incident to a special code that was received in connection with activating the phone. In this embodiment, the codes that are provided to computing device 254 are special codes that, when entered into mobile device 218, not only start an activation sequence but trigger the execution of functionality-impairment instructions 230A.

Turning now to FIG. 3, a flow diagram is provided that depicts one embodiment for reducing mobile-phone fraud according to the technology. FIG. 3 includes a depiction of a wireless telecommunications network 310 and a mobile device 312 and a service center 314. These devices are comparable and similar to the devices previously discussed in connection with FIGS. 1-2B. At a step 316, an activation request 318 is communicated to wireless telecommunications network 310. As previously alluded to, this activation request might be received by network 310 in a variety of ways. A first way includes receiving an activation request from a mobile device itself. Another way includes receiving a request by way of a computing device such as computing device 254. In this embodiment, a user submits a request by way of computing device 254, which is coupled by one or more networks such as the Internet 252 so as to submit the activation request.

At a step 320, activation data 322 is sent from wireless telecommunications network 310. Although 312 indicates for discussion purposes that the activation data 322 is communicated to mobile device 312, in one embodiment the activation data 322 is sent to a device such as computing device 254 in the form of activation codes or other data. Thus, this data can be received directly or indirectly by mobile device 312. In a situation where activation data is communicated to a computing device, the computing device will present information that is usable by mobile device 312 in order to activate it on wireless telecommunications network 310.

As previously mentioned, activation 322 might take the form of codes that, when entered into mobile device 312, begin an activation process that ultimately allows mobile device 312 to communicate data through wireless telecommunications network 310. In another embodiment, activation is done completely over the air such that activation data is communicated directly to mobile device 312, which uses it to complete an activation process that results in mobile device 312 being able to communicate via wireless telecommunications network 310.

In one embodiment, mobile device 312 provides activation-response data 324 to wireless telecommunications network 310 at a step 326. The activation-response data 324, if provided at all, is usable by wireless telecommunications network 310 to register mobile device 312 in a way that will allow it to communicate by way of the network 310.

At a step 328, functionality-impairment instructions 330 are communicated to mobile device 312. In one embodiment, these functionality-impairment instructions come from wireless telecommunications network 310. In another embodiment, these instructions could have always resided on mobile device 312. For example, they could have been embedded within a memory component of mobile device 312 at the manufacturing or other early stage. In such an embodiment, the functionality-impairment instructions 330 could be activated incident to receiving a certain code, which might be communicated to mobile device 312 upon a determination that it is reportedly lost or stolen.

Functionality-impairment instructions 330 deliberately cause a set of predetermined problems on mobile device 312. And although the problems are predetermined in one embodiment, they do not need to be the same for all mobile devices. For example, a first set of functionality-impairment instructions might affect a mobile device's keyboard (buttons or touch screen). But another set of functionality-impairment instructions sent to a different mobile device might cause a different set of issues, such as input problems. One of the reasons for randomizing the problems that are caused on devices is to prevent nefarious users from easily determining that a set of problems associated with a mobile device are deliberate instead of real.

If every mobile device had its "4" key rendered inoperable, then these users would quickly learn that if a mobile device's "4" key is not working, then the mobile device is probably not really damaged at all but has been placed into an artificial state of impairment. These users would then try to develop a work-around so as to re-enable the functional aspects that were deliberately disabled. But if the impairments are more subtle and randomized, then it would be harder for users to determine that the problems associated with a mobile device were or were not deliberately inflicted.

Eventually, the mobile device is taken to a service center 314. At the service center, a technician can provide diagnostic information 334 to the wireless telecommunications network 310 at a step 332. In one embodiment, this includes sending a unique identifier such as unique identifier 224 to wireless telecommunications network 310. At this point, a server such as server 214 could reference a database to see whether the device corresponding to unique identifier 224 has been reported as lost or stolen. In some embodiments, this data store could reside on server 214 as well. In other embodiments, the server could be coupled to the network, as shown by reference numeral 256 in FIG. 2B.

In other embodiments, diagnostic information 334 includes an indication of the types of problems that the mobile device is experiencing. For example, a technician could input at the service center that a mobile device is suffering from a screen flicker, keypad-entry problem, etc. In still other embodiments, the service center could present a troubleshooting procedure that requests information from the technician. Based on the answers provided to the questions, the wireless telecommunications network 310 will be able to determine whether the problems affecting the mobile device were deliberately caused as a result of the phone being reportedly lost or stolen.

Similarly, in another embodiment, the user himself or herself could attempt to troubleshoot the device by receiving instructions from a website associated with the wireless-telecommunications-network operator. In this embodiment, based on the answers, the user would be presented with an indication that the problems can be remedied by taking the device to an authorized service center. Alternatively, the user could simply be instructed to take the device to an authorized service center. At the service center, the technician would then learn that the mobile device is reported as lost or stolen as previously described.

That is, an indication 338 is presented to the service center at a step 336 that indicates that the mobile device 312 is reported as lost or stolen. This indication 338 does not necessarily need to come from the wireless telecommunications network per se. It might come directly or indirectly from the wireless telecommunications network or another computing device that is equipped with an ability to provide the indication. At a step 342, the presentation 340 is presented at service center 314.

Figure 4:
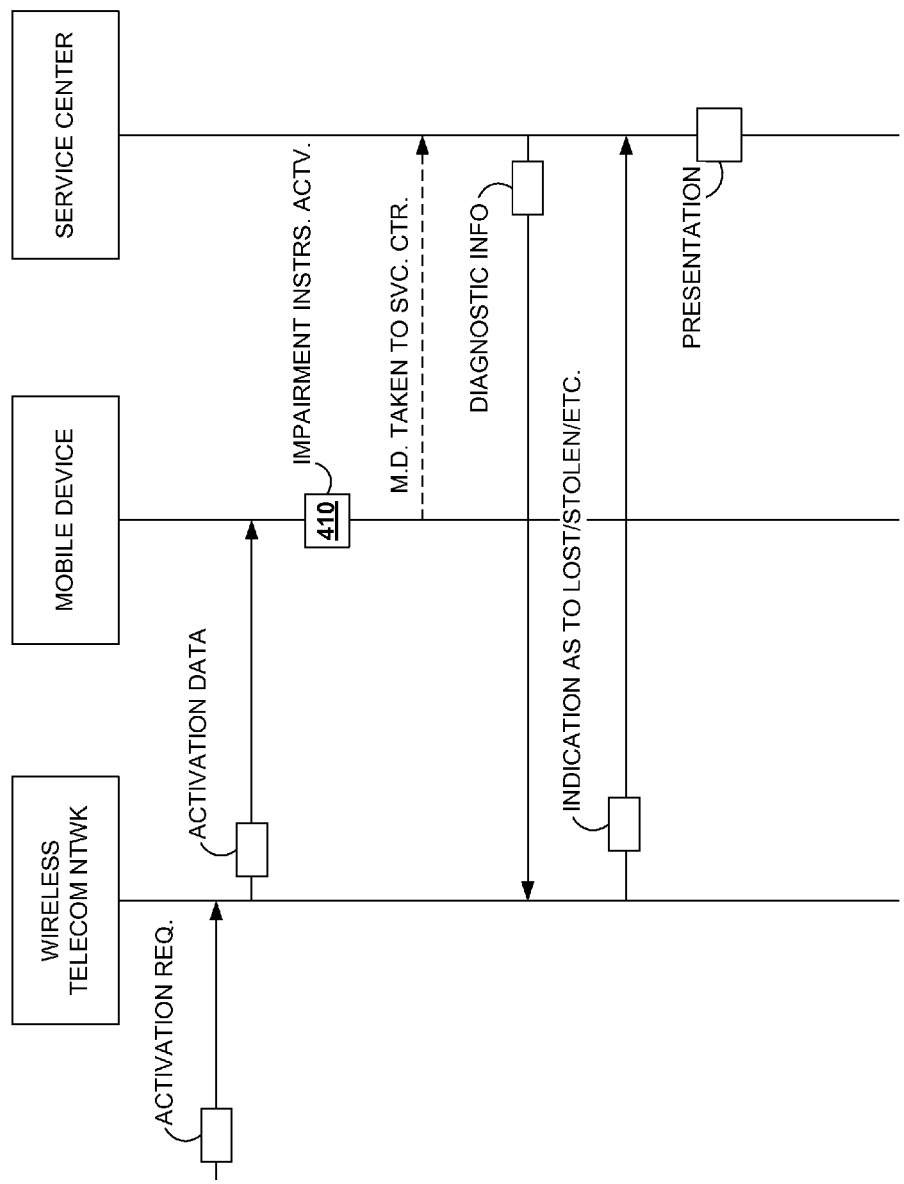

Turning now to FIG. 4, another illustrative process-flow diagram is provided that illustrates another embodiment of the technology to facilitate a method of reducing mobile-phone fraud. For the sake of brevity and simplicity, the elements in FIG. 4 that correspond to FIG. 3 are not relabeled. But to further explain that another embodiment is contemplated within the scope of the invention, FIG. 4 shows that the activation-response data does not necessarily need to be communicated to the wireless telecommunications network. That is, in some embodiments mobile device 312 is able to be activated as a result of receiving activation data 322 alone. Moreover, the impairment instructions can be activated as shown by reference numeral 410, which indicates that they were already present on the mobile device or were received by the mobile device in a different way than over the air from the wireless telecommunications network.

Figure 5:
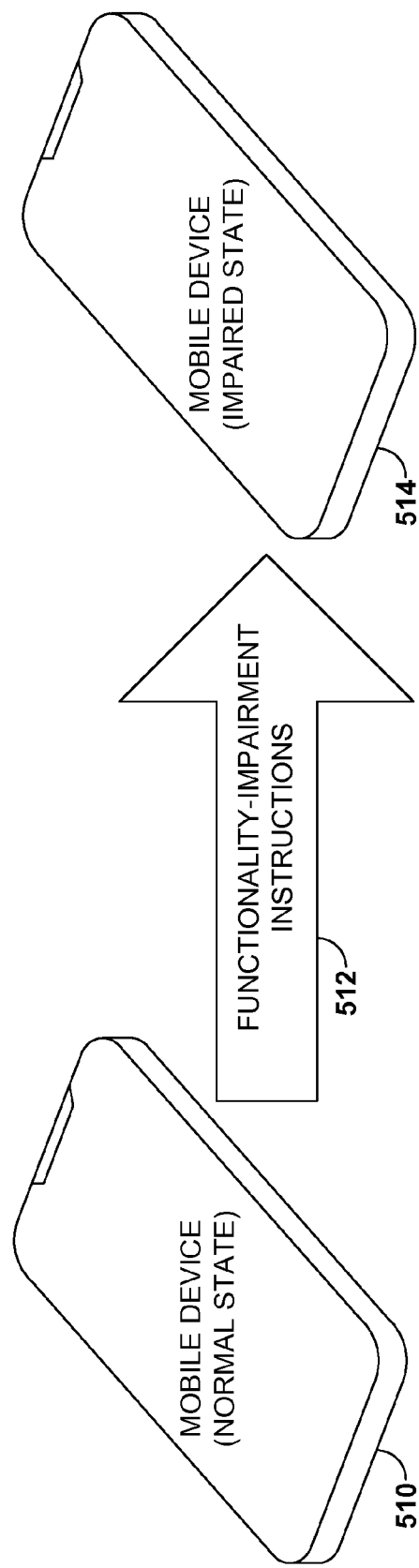
FIG. 5 depicts mobile device transitioning from a mobile state into an impaired state.
Figure 6:
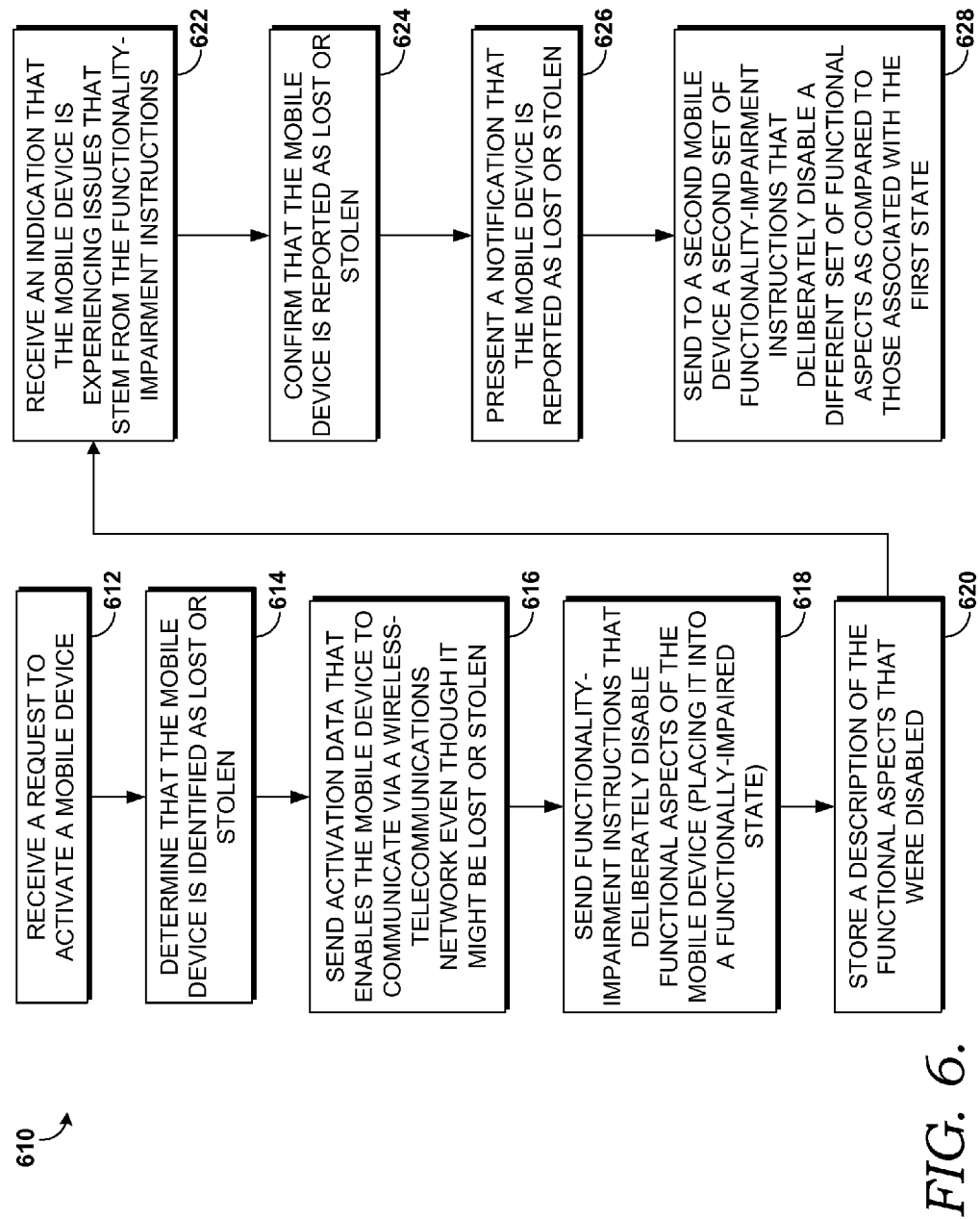
FIGS. 6-8 depict three illustrative methods for reducing mobile-phone fraud according to embodiments of the technology.

Turning now to FIG. 5, an illustration is shown whereby a mobile device is in a first state 510 (a normal state) and then transitions 512 to a second state 514 (an impaired state). As previously mentioned, the mobile device in the normal state 510 can transition to the impaired state 514 in a variety of ways in connection with executing a set of embodied instructions that ultimately cause the mobile device to be placed into the impaired state 514. Turning now to FIG. 6, an illustrative method for reducing mobile-phone fraud is provided and referenced generally by the numeral 610.

At a step 612, a request to activate a mobile device is received. The activation request can be received by way of the Internet, mobile device, and/or some other vehicle. At a step 614, a determination is made that the mobile device is identified as lost or stolen. One way of determining that the mobile device is identified as being lost or stolen is to query and then receive a response back from a database that stores information about mobile devices that are reported as being lost or stolen. In one embodiment, this database resides on a server such as server 214 in connection with a wireless-telecommunications network. In other embodiments, it is coupled to the network as shown by reference numeral 256 in FIG. 2B.

At a step 616, activation data is sent that enables the mobile device to communicate via a wireless telecommunications network even though the mobile device might be lost or stolen. Thus, in this embodiment, the mobile device is not prohibited from being activated. The mobile phone might be a new or pre-owned phone and a pre-owned phone could be characterized as legitimate or illegitimate.

Sometimes mobile phones are stolen even before they hit the stores. In such a situation, these phones could be identified by the provider as lost or stolen. When someone attempts to activate a phone, they will ultimately have the phone intentionally plagued with a set of one or more problems that will motivate them to bring the phone into an authorized service center where it can be recovered according to an embodiment of the technology. Although throughout this document we have often referred to phones being lost or stolen, we mean to include within the scope of those terms situations such as broken or otherwise unusable.

For example, a user might drop his or her phone into a sink of water and then report it damaged. If this is a situation that would allow the user's insurance to be applicable, then although technically the phone is not lost or stolen it is still unusable and presumed to no longer be legally owned by the user or at least be lawfully retrievable by the wireless-telecommunications-network provider or designee.

At a step 618, functionality-impairment instructions are sent to the mobile device that deliberately disable functional aspects of the mobile device thereby placing it into a functionally-impaired state. As previously mentioned, these functionality-impairment instructions can be sent directly to the mobile device over the air or indirectly by way of another means, such as coupling the phone to a computing device that is used in connection with activating the phone.

At a step 620, a description of the functional aspects that were disabled is stored. The description can take the form of actual problems that were inflicted onto the phone or might be as simple as logging a unique identifier that identifies the phone. This data can be logged in a server such as server 214 or in a database such as database 256, for example. With this data stored, the phone can be identified at a later time as being reportedly lost or stolen.

At a step 622, an indication that the mobile device is experiencing issues that stem from the functionality-impairment instructions is received. As previously mentioned, this indication can be received as a result of the phone being taken into a service center; and, thus, communicated by way of a technician attempting to troubleshoot the phone. Or in other embodiments, this indication might come more directly from the user by way of a computing device coupled to the Internet wherein the computing device was being used to present troubleshooting information that the user was carrying out on the mobile device. At some point the computing device might request information from the user, and this information would be used to create an indication that was received as described in step 622.

At a step 624, confirmation is made that the mobile device is reported as being lost or stolen. Thus, if a technician requested troubleshooting help or for whatever reason sent the mobile device's unique identifier to the wireless telecommunications network, then it would inspect either server 214 or database 256 to determine whether the device is reportedly lost or stolen. If it is, then at a step 626 a notification would ultimately be presented that the mobile device is reported as lost or stolen. In one embodiment, this step contemplates sending information to an entity such as service center 314, which would include a computing device upon which a notification would be presented. In other embodiments, the presentation could occur on the phone itself.

At a step 628, incident to receiving another indication that another mobile device is experiencing problems, a wireless telecommunications network could communicate a different set of functionality-impairment instructions that would result in a still different set of problems being manifested on the other mobile device. We have previously mentioned that one of the reasons of doing this is to prevent nefarious users from determining that a given device has been deliberately put into a problem state that is relatively easy to recover from if the right information is known.

Figure 7:
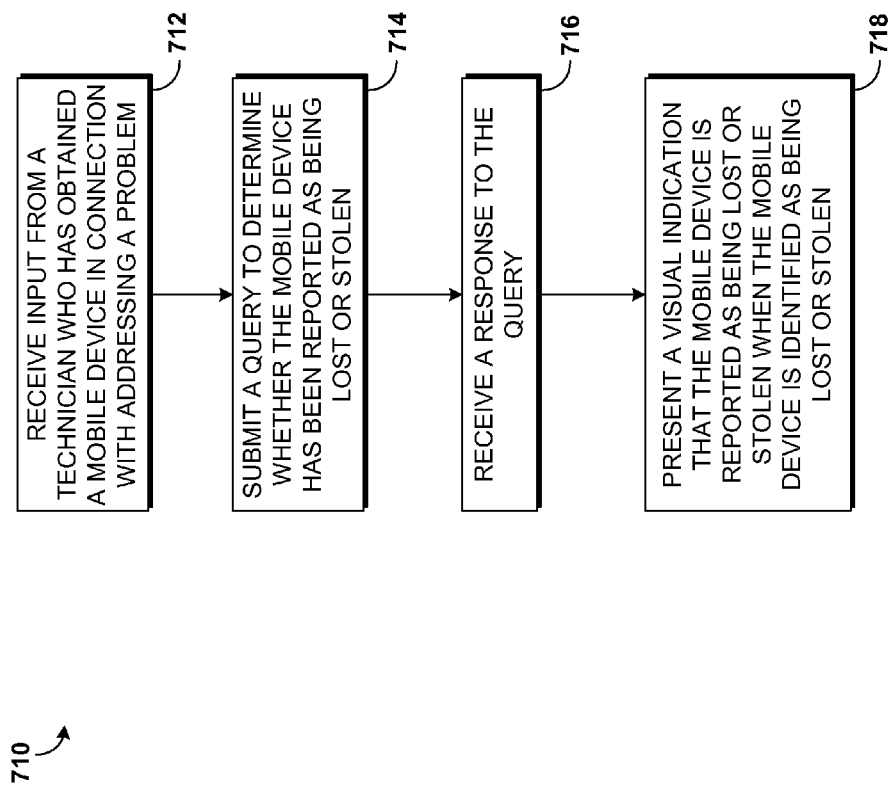

Turning now to FIG. 7, another method for reducing fraud by way of recovering a lost or stolen mobile device is provided and referenced generally by the numeral 710. This embodiment includes receiving input from a technician who has obtained a mobile device in connection with addressing a problem. A computing device used in connection with troubleshooting the phone submits a query to determine whether the mobile device has been reported as lost or stolen in a step 714. In one embodiment, this query includes a unique identifier of the mobile device.

A response to the query is received at a step 716. In connection with this response, one embodiment contemplates presenting a visual indication at a step 718 that the mobile device is reported as being lost or stolen when the mobile device is identified as being lost or stolen.

Figure 8:
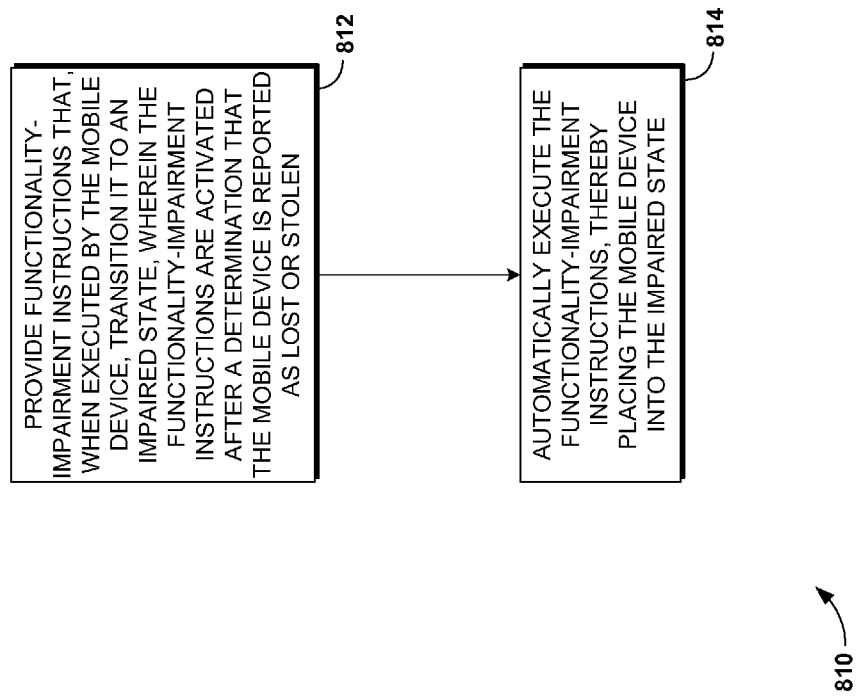

Turning now to FIG. 8, still another method for reducing mobile-phone fraud is provided and referenced generally by the numeral 810. In this embodiment at a step 812, functionality-impairment instructions are provided that, when executed by the mobile device, transition it to an impaired state. This impaired state stems from executing the functionality-impairment instructions after a determination is made that the mobile device is reported as lost or stolen. The functionality-impairment instructions could be provided from a variety of sources. We have mentioned several earlier in this document. The different types of impairments might include a keyboard impairment, a display impairment, a power impairment, or an operational impairment.

At a step 814, the functionality-impairment instructions are automatically executed, thereby placing the mobile device into the impaired state, such as that represented by numeral 514 of FIG. 5.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. Non-transitory computer-readable media having computer-executable instructions embodied thereon, that, when executed by a computing device, facilitate a method of reducing mobile-phone fraud, the method comprising:
    determining that a mobile device is lost or stolen;
    deactivating the determined lost or stolen mobile device, wherein deactivating prevents the determined lost or stolen mobile device from communicating via a wireless-telecommunications network;
    receiving a request to activate the determined lost or stolen mobile device from the determined lost or stolen mobile device;
    upon receiving the request to activate from the determined lost or stolen mobile device, communicating to the determined lost or stolen mobile device activation data, which enables the mobile device to communicate via a wireless-telecommunications network; and
    communicating to the mobile device functionality-impairment instructions, which, when run on the mobile device, deliberately disable a set of functional aspects of the mobile device thereby transforming the mobile device from a first state to a second state and wherein the second state is functionally impaired as compared to the first state.

2. The computer-readable media of claim 1, wherein the determining that the mobile device is lost or stolen is incident to submitting an inquiry to a database that stores information about mobile devices that are reported as being lost or stolen.

3. The computer-readable media of claim 1, wherein the request to activate the determined lost or stolen mobile device is received via one or more of the following:
    the Internet;
    the mobile device.

4. The computer-readable media of claim 1, wherein the determining that the mobile device is lost or stolen includes receiving a response from a database that stores information about mobile devices that are reported as being lost or stolen.

5. The computer-readable media of claim 4, where the response is received incident to an inquiry regarding a status of the determined lost or stolen mobile device, wherein the status includes new or preowned and wherein the preowned status could be further characterized legitimate or illegitimate.

6. The computer-readable media of claim 5, wherein the illegitimate characterization indicates one or more of stolen, lost, broken, or unusable.

7. The computer-readable media of claim 1, wherein communicating the activation data includes instructing a first communications device to send the activation data to the determined lost or stolen mobile device.

8. The computer-readable media of claim 1, wherein communicating the functionality-impairment instructions includes instructing the first or a second communications device to send the functionality-impairment instructions to the determined lost or stolen mobile device.

9. The computer-readable media of claim 8, wherein the functionality-impairment instructions impair various functional aspects of the determined lost or stolen mobile device, including one or more of the following aspects:
    data-input functionality; and
    data-output functionality.

10. The computer-readable media of claim 9, wherein data-input functionality includes one or more of:

keyboard functionality such that certain keys are not responsive to inputting data; and
voice-input functionality.

11. The computer-readable media of claim 9, wherein data-output functionality includes one or more of:
display functionality such that a display of the determined lost or stolen mobile device presents data in an undesirable manner; and
audio functionality such that sound outputted from the determined lost or stolen mobile device is outputted in an undesirable manner.

12. The media of claim 1, in connection with a request for service, further comprising:
receiving an indication that the determined lost or stolen mobile device is experiencing issues that stem from the functionality-impairment instructions;
confirming that the determined lost or stolen mobile device is reported as lost or stolen; and
presenting a notification that the determined lost or stolen mobile device is reported as lost or stolen.

13. The media of claim 1, further comprising storing a description of the functional aspects that were disabled, thereby enabling an indication of the description to be presented incident to troubleshooting the determined lost or stolen mobile device.

14. The media of claim 1, further comprising communicating to a second determined lost or stolen mobile device a second set of functionality-impairment instructions that deliberately disable a different set of functional aspects as compared to those associated with the determined lost or stolen mobile device.

15. A method of recovering a lost or stolen mobile device, comprising:
incident to receiving input from a technician who has obtained the mobile device in connection with addressing a problem associated with the mobile device, submitting a query to determine whether the mobile device has been reported as being lost or stolen, wherein the problem was deliberately caused by instructions received from a wireless-telecommunications-network provider when activating the mobile device and wherein a description of the functional aspects that were disabled by the instructions is stored, thereby enabling an indication of the description to be presented incident to troubleshooting the lost or stolen mobile device; and
receiving a response to the query;
presenting a visual indication that the mobile device is reported as being lost or stolen when the mobile device is identified as being lost or stolen.

16. The method of claim 15 wherein the input from the technician includes an identifier that uniquely identifies the mobile device.

17. The method of claim 15,
wherein the instructions received from the wireless-telecommunications-network provider transition the mobile device from a first state to an impaired state,
wherein the impaired state is characterized as being impaired with respect to the first state, and
wherein the impaired state is further characterized as deliberately disabling functional aspects of one or more of the following,
(1) a keyboard of the mobile device,
(2) a microphone of the mobile device, on
(3) a display of the mobile device.

18. Non-transitory computer-readable media having computer-executable instructions embodied thereon, that, when executed by a computing device, facilitate a method of receiving activation data that is usable to enable a determined lost or stolen mobile device to be used on a wireless-telecommunications network, the method comprising:
providing activation data to the determined lost or stolen mobile device enabling the determined lost or stolen mobile device to communicate with other mobile devices by way of the wireless-telecommunications network;
providing functionality-impairment instructions to the determined lost or stolen mobile device that, when executed by the determined lost or stolen mobile device, transition it to an impaired state, wherein the functionality-impairment instructions are activated after a determination that the determined lost or stolen mobile device is reported as lost or stolen;
automatically executing the functionality-impairment instructions, thereby placing the determined lost or stolen mobile device into the impaired state, which is characterized by one or more of the following,
(1) keyboard impairment, wherein a selection of buttons no longer input data correctly into the determined lost or stolen mobile device;
(2) display impairment, wherein a display of the determined lost or stolen mobile device does not present data correctly;
(3) power impairment, wherein a power supply of the determined lost or stolen mobile device does not function correctly;
(4) operational impairment, wherein the determined lost or stolen mobile device does not operate as it should but for being in the impaired state.

19. The computer-readable media of claim 18, wherein communication ability of the determined lost or stolen mobile device with the other wireless mobile devices is impeded as a result of the functionality-impairment instructions.

* * * * *